April 5, 1966 R. CASSEL 3,243,845
WEB STRETCHING MACHINE
Filed Sept. 22, 1964 2 Sheets-Sheet 1
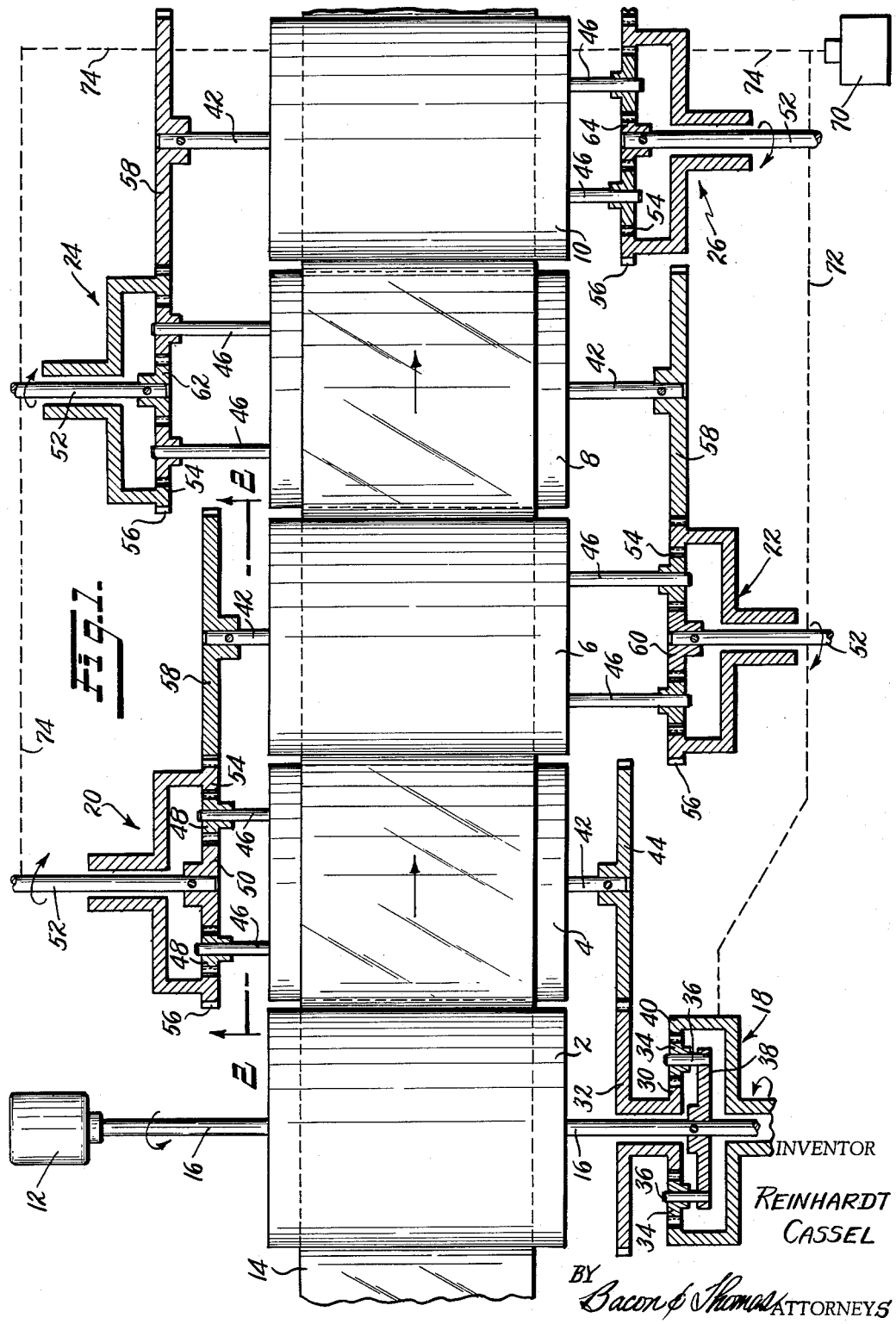
INVENTOR
REINHARDT CASSEL
BY Bacon & Thomas ATTORNEYS

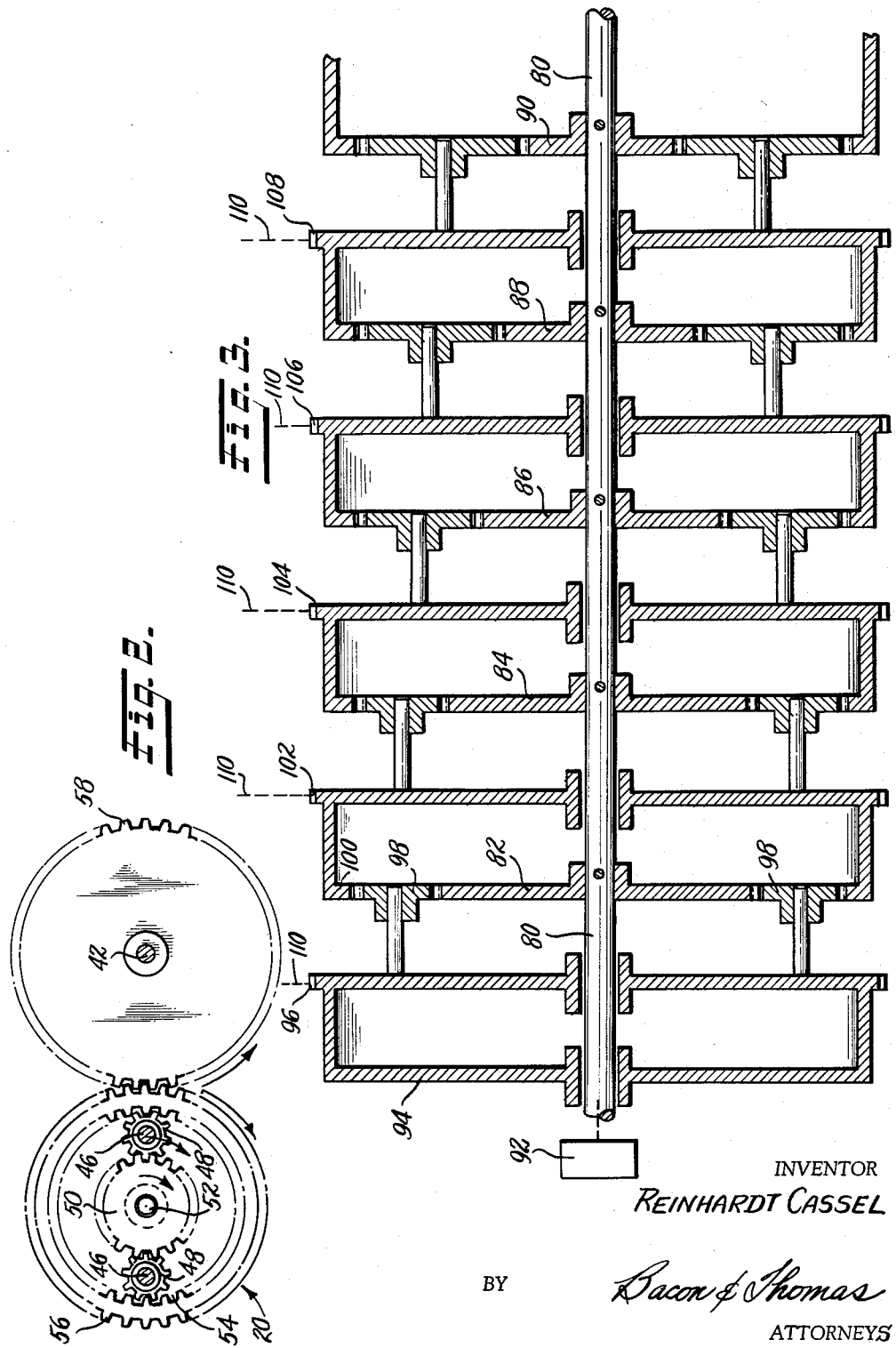

United States Patent Office 3,243,845
Patented Apr. 5, 1966

3,243,845
WEB STRETCHING MACHINE
Reinhardt Cassel, Bielstein, Rhineland, Germany, assignor to Berta Kampf, Eberhard Kampf, and Herbert Kampf, trading as Firma Erwin Kampf Maschinenfabrik, Bielstein-Muhlen, Rhineland, Germany
Filed Sept. 22, 1964, Ser. No. 398,304
6 Claims. (Cl. 18—1)

This invention relates to web stretching machines and particularly to machines comprising a series of rollers for engaging and stretching a web or foil of material, which material may be plastic or otherwise.

Machines of this general type have been known heretofore wherein the web of material to be stretched was trained over successive rollers of a series of rollers, the last one of which was driven at a higher speed than the first roll of the series. Thus, the final roll pulled the web faster than it was being fed into the machine with the result that stretching of the web occurred. The engagement of the web with intermediate rollers effected rotation of those rollers and necessarily imposed considerable tensioning stress on the web. Thus, the total tension or stretch applied to the web was very limited and if the same was quite thin, rupture or tearing of the material often occurred.

According to the present invention a series of rollers is employed, arranged in side-by-side relation with their axes all lying in generally the same plane and wherein the web of material to be stretched is threaded under and over the rolls alternately to follow a sinuous path through the machine. Means are provided for positively driving each roller in the web advancing direction and at a surface speed greater than the speed of the previous roller so that each roller thus frictionally engages and advances the web and directly effects a predetermined portion of the stretching thereof. Thus, the web is not required to drive any of the rollers and much faster operation is possible and it is also possible to stretch webs to a thinner section without danger of rupture. Each roller is positively driven through gearing connections to the previous roller whereby each is driven at a rate faster than the previous roller, in equal steps, preferably the speeds of successive rollers of the series are related in arithmetic progression. The invention also includes features whereby the difference in speed of successive rollers may be changed to thus regulate the total stretch applied to the material of the web.

It is, therefore, an object of this invention to provide a machine for stretching webs of material capable of stretching thin or weak films or foils without tearing and wherein successive rollers of a series are driven progressively faster in arithmetic progression whereby to impart incremental positive stretching steps to the web.

Still another object of the invention is to provide a machine of the type set forth wherein successive rollers of the series are driven by novel planetary drive means for each roller, each of which drive means is provided with two power inputs.

A further object is to provide a machine of the type set forth wherein the total stretch applied to the web is readily adjustable, even while the machine is in operation.

Other and additional objects and advantages will become apparent to those skilled in the art as the description proceeds with reference to the accompanying drawings wherein:

FIG. 1 is a schematic top plan view of a portion of a machine embodying the present invention;

FIG. 2 is a fragmentary vertical sectional view taken along the line 2—2 of FIG. 1; and FIG. 3 is a plan view in schematic form of a modified form of transmission mechanism.

Referring first to FIGS. 1 and 2 the machine is provided with a series of rollers, 2, 4, 6, 8 and 10, arranged substantially in a row, with their axes all lying in substantially the same plane. Preferably the rolls 2–10 are all of the same diameter although, as will be apparent, they may be of different diameters if the gear ratios of their driving mechanisms are appropriately adjusted.

FIG. 1 merely shows a representative portion of such a machine, it being understood that a greater or fewer number of rollers may be provided, depending upon the material being stretched and the amount of stretch to be imparted thereto.

The first or entrance roller 2 is driven directly from a suitable source of power 12 and at a constant speed, matching the speed of whatever feeding mechanism is employed to feed the web 14 to the machine. As shown, the web 14 is threaded under the rolls 2, 6 and 10 and over the rolls 4 and 8. Preferably the rolls are left slightly spaced apart at their peripheries to facilitate threading the web material therethrough and it is to be noted that the area of contact between the web 14 and each of the rolls is sufficiently great so that rotation of a roll will positively advance the web without slippage.

The power source 12 drives roll 2 through a shaft 16 which extends through the roll 2 to the other side of the same to constitute one input of a planetary transmission 18. The planetary transmission 18 is positioned closely adjacent an end of the roll 2 and similar planetary mechanisms 20, 22, 24 and 26 are positioned adjacent alternately opposite ends of successive rollers, as shown. In the event the machine contains only the five rollers illustrated in FIG. 1, the transmission mechanism 26 shown therein would be omitted since the roll 10 would not then be required to drive any succeeding roller.

Each of the transmission mechanisms 18–26 is a well-known assembly comprising a planetary gear system, each having a sun gear, planetary gears and an orbit gear. In the transmission 18 the sun gear 30 is rotatably journalled on shaft 16 and is fixed to an output gear 32, to be further described. The planet gears 34 are journalled on shafts 36 mounted on a planet gear carrier 38 which in turn is fixed to shaft 16. The planet gears 34 mesh with the sun gear 30 in the well-known manner. An orbit gear 40 is likewise journalled on the shaft 16 and meshes with planet gears 34 but is driven from a source of power different from the power source 12, as will be described. The next succeeding roller 4 is mounted on a shaft 42 to which a spur gear 44 is fixed and which meshes with the output gear 32 of the transmission 18. Preferably, the gears 32 and 44 are of the same pitch diameter so that they rotate at the same angular speed, but in opposite directions. This will always be true when rollers 2 and 4 are of the same diameter. The shaft 42 supports the roller 4 for rotation and the other end of that roller is provided with a pair of stub shafts 46 constituting the planet gear carrier for the transmission 20. Planet gears 48 are journalled on the shafts 46 and mesh with a sun gear 50 fixed on a shaft 52, to be further described. The orbit gear 54 is provided with internal teeth meshing with the planet gears 48, is journalled on the shaft 52 for free rotation thereon, and is provided with an external spur gear 56 meshing with a spur gear 58 fixed to the next adjacent roll 6. The planetary transmissions 22, 24 and 26 are all identical in structure and operation to the transmission 20 just described except that the sun gear 60 of transmission 22 is smaller than the sun gear 50 of transmission 20 and the sun gears 62 and 64 of successive transmissons 24 and 26 are each progressively smaller than the sun gears associated with the previous transmission. Of course, it is necessary also to employ planet gears of larger diameter in each successive transmission since the orbit gears of each are all of the same pitch diameter. Identical parts of the transmissions 20–26 are identified by the same reference numerals. It is to be noted that the external gears 56 and the driven gears 58 are preferably all of the same pitch diameter, as previously described. In each of the transmissions connected to rollers 4–10, the sun gears 50–64 constitute one power input, the planet gear carrier defined by stub shafts 46 constitute a second power input and the external gears 56 constitute power outputs. In the transmission 18 the carrier 38 constitutes one power input whereas orbit gear 40 is the other power input and sun gear 30 and its associated gear 32 define the output. As will be obvious, the transmission 18 functions in a manner identical to the transmissions 20–26 and could be identical therewith as to structure except for the difficulties of applying power to the different inputs, since one of the inputs is driven directly by the power source 12. It will be obvious to those skilled in the art how to choose the gear diameters to achieve the desired results, described hereinafter.

A second power source 70, which comprises a variable speed device, is connected through transmission means schematically indicated at 72 and 74 to one of the power inputs of each of the transmissions. For example, it is connected to drive orbit gear 40 of transmission 18 and shafts 52 of each of the transmissions 20–26 at the same speed of rotation. All those inputs are driven at the same speed even though that speed may be varied or changed relative to the speed of rotation of the first power source 12.

As indicated by the curved arrows in the drawings the shafts 52 and orbit gear 40 are driven in the same direction as the direction of rotation of their associated rollers. Thus, both inputs to each transmission are driven in the same direction. For example, as viewed from the bottom of FIG. 1, rolls 2, 6 and 10 are driven counter-clockwise while rolls 4 and 8 are driven clockwise. Thus, each of the rollers advances the web 14 in the same direction.

Referring first to the drive for roller 2, it will be obvious that if power source 12 and power source 70 are driven at the same speed, then the carrier 38, orbit gear 40 and sun gear 30 will all rotate as a unit and there will be no relative movement between the parts. Under these conditions roll 4 will be driven through gear 44 at the same speed as roll 2 and each successive roll will also be driven at the same speed since the inputs to all the transmissions will be the same. However, if the input from power source 70 to orbit gear 40 is at a lower angular speed than the speed of rotation of roller 2, it will be apparent that sun gear 30 and output gear 32 will be driven faster than the roll 2 and will thus drive roll 4 at a greater speed, depending upon the difference in speed between power sources 70 and 12 and the gear ratios in the transmission 18 but that difference in speed will remain constant as long as the speed of power source 70 is unchanged. By inspection of FIG. 2, it will also be obvious that the speed of rotation of the output gear 56 of transmission 20 is greater than the speed of rotation of the planet carrier shafts 46 and roll 4 and thus roller 6 is driven at a higher speed than roller 4. This is true because the planet carrier shafts 46 rotate clockwise, as seen in FIG. 2, and sun gear 50 also rotates clockwise, even though at a lower speed than carrier shafts 46, and thus the output gear is driven at a higher rate than the carrier shafts 46. The ratio of diameters of the orbit gear 54 and sun gear 50 are selected so that the surface speed of roller 6 is greater than the surface speed of roller 4 by the same amount that the speed of roller 4 is greater than that of roller 2.

Exactly the same relationships and analysis applies to the operation of each successive transmission and thus the objectives of the invention are accomplished. It will be obvious that the speed of rotation of power source 12 determines the throughput or speed of feed of material to the machine whereas the speed difference between power source 70 and power source 12 determines the actual amount of stretch imparted to the web. As stated, the power source 70 is adjustable from a speed equal to that of source 12 to any desired lower speed. It will also be obvious to those skilled in the art that the total stretch imparted to the web is applied in equal increments at each of the stretching rollers, thus relieving the web of excessive or unnecessary tensile stresses, and enabling any given web to be stretched a greater total amount than was possible with the previously known machines.

All of the transmissions 18–26 could be arranged on the same side of the series of rollers 2–10 rather than being alternately at opposite ends of their associated rollers, as shown. The illustrated arrangement is preferred, however, since it permits a more compact machine construction.

FIG. 3 schematically shows an alternative embodiment wherein all of the transmissions corresponding to transmissions 18–26 of FIG. 1 are combined in a single assembly. A single central shaft 80, corresponds functionally to all of the shafts 52 of FIG. 1 and the progressively smaller sun gears 82–90 of each planetary gear set are fixed directly to the shaft 80. The shaft 80 is driven by a variable speed power source 92, corresponding to power source 70 of FIG. 1. The structure 94, journalled on the shaft 80, corresponds to the roller 2 of FIG. 1. This structure is driven by a power source (not shown) corresponding to the power source 12 of FIG. 1 by means not shown and its output gear 96 may be connected, by suitable gearing, chain drive or other means to the first roll of a series of rollers arranged as shown in FIG. 1. Thus, the first roller will be driven at a speed independent of the speed of rotation of the shaft 80. The output gear 96 also constitutes a carrier for planet gears 98 which mesh with sun gear 82 fixed to shaft 80. Thus, the orbit gear 100, which is fixed to output gear 102 corresponds to the output gear 56 associated with roller 4 of FIG. 1. In like manner, each successive planetary gear set is driven in a manner identical to that described in connection with FIG. 1 and their respective output gears 104, 106 and 108 may be connected through any suitable drive means 110 to the respective stretching rollers, corresponding to the rollers shown in FIG. 1.

Obviously, other forms of planetary gearing may be employed for the transmissions of either form of the invention. For example, planetary gearing employing bevel gears rather than spur gears may be employed.

While a limited number of embodiments of the invention have been shown and described herein, it is to be understood that the same are merely illustrative of the principles involved and that other forms may be resorted to within the scope of the appended claims.

I claim:

1. In a machine for stretching a web of material: a series of sequentially arranged rollers for frictionally engaging and advancing said web; a series of planetary gearing units for driving said rollers; each unit having first and second input members and an output member; the first input member of each unit being driven from a common power source and the second input member of each unit except the first unit of said series being driven from the output member of the preceding unit; the output members of successive units being drivingly connected to successive rollers of said series, the gear ratios of each of said units being such that the surface speed of each successive roller is greater than the speed of its preceding roller by the same amount; and a further power source drivingly connected to the second input member of said first unit.

2. A machine as defined in claim 1 wherein the speed of said common power source is selectively variable relative to the speed of said further power source.

3. A machine as defined in claim 1 wherein each unit is adjacent one of said rollers and comprises a sun gear, planet gears on a carrier and an orbit gear; the orbit gear of each unit except the first unit of said series being said output member; said output orbit gears each being drivingly connected to a succeeding roller by gearing having a one-to-one ratio.

4. A machine as defined in claim 3 wherein each of said carriers is fixed to its adjacent roller to be driven thereby.

5. A machine as defined in claim 4 wherein successive units are at respectively opposite ends of successive rollers, each of said rollers serving as a driving connection from the output of one unit to an input of the next successive unit.

6. A machine as defined in claim 1 wherein all said units are arranged in an axially aligned assembly; said common power source comprising a shaft extending axially through said assembly; said units each including a sun gear, comprising said first input member, and being fixed to said shaft.

References Cited by the Examiner
UNITED STATES PATENTS

| | | | |
|---|---|---|---|
| 2,052,255 | 8/1936 | Shoults | 226—188 XR |
| 2,142,718 | 1/1939 | Dreyfus | 264—288 |
| 2,745,134 | 5/1956 | Collins. | |
| 2,767,435 | 10/1956 | Alles | 264—288 |
| 3,119,537 | 1/1964 | Smits | 226—188 XR |

WILLIAM J. STEPHENSON, *Primary Examiner.*